July 15, 1958 H. W. BUTTERWORTH ET AL 2,843,012

PHONOGRAPH PERFORMANCE ILLUSTRATOR

Filed Nov. 23, 1955 4 Sheets-Sheet 1

INVENTORS
HERBERT WALLACE BUTTERWORTH
& SAMUEL P. MORSE
BY
Kenyon & Kenyon
ATTORNEYS.

INVENTORS
HERBERT WALLACE BUTTERWORTH
& SAMUEL P. MORSE
BY
Kenyon & Kenyon
ATTORNEYS.

INVENTORS
HERBERT WALLACE BUTTERWORTH
& SAMUEL P. MORSE
BY
Kenyon & Kenyon
ATTORNEYS.

July 15, 1958 H. W. BUTTERWORTH ET AL 2,843,012

PHONOGRAPH PERFORMANCE ILLUSTRATOR

Filed Nov. 23, 1955 4 Sheets-Sheet 4

INVENTORS
HERBERT WALLACE BUTTERWORTH
& SAMUEL P. MORSE
BY
Kenyon & Kenyon
ATTORNEYS.

United States Patent Office 2,843,012

Patented July 15, 1958

2,843,012

PHONOGRAPH PERFORMANCE ILLUSTRATOR

Herbert Wallace Butterworth, New York, and Samuel P. Morse, Carle Place, N. Y.; said Morse assignor to said Butterworth Application November 23, 1955, Serial No. 548,588

8 Claims. (Cl. 88—28)

This invention relates to a phonograph performance illustrator. In other words, the invention is concerned with an apparatus which may be used to illustrate pictorially the various phases of a performance during the playing back of a phonograph record of the audio of this performance. Of course, the performance must be of a type capable of both audio and visual reproduction.

Any standard disk recording of an opera provides a good example of the type of record with which this invention may be used. When such a record is phonographically reproduced in the home, for example, the listener very frequently has not seen the opera as a live performance, nor does he understand the words which are sung in a foreign language. This leaves the listener with a lost feeling while attempting by imagination only to construct mentally the actual appearance of the various scenes and the location of the performers, while listening only to the audio end of the performance as the record is played on a phonograph.

One of the objects of the present invention is to provide for a relatively simple and inexpensive apparatus which may be sold to the average home phonograph user and which will positively and automatically illustrate the various scenes of the described type of performance in conjunction with the audio reproduction by a standard phonograph record, along with the exact words both in the language being sung as well as the native tongue, and so that the illustrations occur sequentially in an order and for time periods and at the proper times to suit the performance of which the audio is being played back by the phonograph. This apparatus necessitates the production of a series of still pictures, such as transparencies adapted for reproduction by optical projection on a suitable screen, and it is obvious that such a series should be suitable for illustrating any given performance, such as one of the well-known operas, regardless of whether the phonograph record is the product of Columbia, Victor or any of the other phonograph record producers. The recordings of these various producers are taken from different performances of the same work and, therefore, the timing of the various phases of the performance may differ. With this in mind, another object of the invention is to provide an apparatus which may use the same series of pictorial illustrations of the same performance but may be differently cued to the different makes of records of this same work as required to fit any differences in the timing of the various phases.

In the professional field the present invention fills a serious void that has developed with the popularization of television. When radio was the main source of home entertainment the manufacturers of popular phonograph records, and the authors of the music and lyrics recorded by such records, were able to introduce new works to the public at large through the well-known disc jockeys. The short advertisements introduced during record changing was both a source of revenue to the radio stations and a boon to merchandisers who could not afford extravagant full-length programs. When the public shifted to television as a source of home entertainment it was found to be practically impossible to shift the disc jockeys' services into this field. The public does not want to gaze at a man playing records and it has shown dissatisfaction with the expedient of the use of moving pictures and the like during the record playing. Special moving pictures are too expensive to be used with the disc jockey type of program. The disc jockey is relatively untrained as a visual performer and, therefore, he does not have a ready means for injecting advertising material into his program excepting by the playing of advertising records.

A further object of the present invention is to provide an apparatus particularly adapted for the use of the disc jockey on television, whereby to make it possible to provide such an operator with a series of still pictures automatically cued to the standard popular records regardless of their particular manufacturer and which may also be cued to the advertising records, so that again the disc jockey can return to his relatively obscure position while providing the television audience with record reproductions, both entertaining and advertising, accompanied automatically by visual displays having the true professional touch yet which are inexpensive. This lack of expense is obtained because this invention uses still pictures which are relatively few in number, as compared to motion picture film, for example, and because each series of the still pictures when once cued may be marked with an identification of the particular record manufacturer's name and record number, and the same series used by various television stations throughout the country.

It is to be noted from the above that one feature of the invention is that the series of pictures used do not require the use of a special audio recording. The manufacturer of the picture series may cue it to any given record of any make and identify the series, many reproductions of this may then be made for general distribution, and each recipient of the series can produce a combination audio and visual reproduction simply by purchasing the same record from any record store throughout the country. It is only necessary to ask for the record by the manufacturer's name and number. When this invention is used the various visual scenes are reproduced in their proper order or sequence and each picture is displayed, not for a fixed interval of time, but for a time entirely appropriate to the audio performance of the record being played. Such time periods may vary from a relatively long time to a very short time and where the audio recording suggests rapid performance, such as a dueling scene in an opera, for example, the various visual scenes may be shifted by the present invention with great rapidity to indicate the rapid or violent motion suggested by the audio performance. Home users are familiarized with the actual scenes and locations of the performance of the audio they hear from the standard records they purchase in the open market. The void resulting from television is filled to the advantage of the record manufacturers, television stations, and the authors of the music and lyrics of new popular performances which when recorded are at first unfamiliar to the public at large.

A specific example of the present invention is illustrated schematically and diagrammatically by the accompanying drawings in which.

The illustrated apparatus is suitable for exhibiting still pictures which visually illustrate in appropriate sequence and for appropriate time periods various representative phases of an audio record of a performance capable of both audio and visual reproduction. As previously explained such a record may be a standard disk phonograph record carrying a recording of an opera, musical comedy or the like. The record may represent merely a popular work or a single song from a musical comedy.

Figure 2:
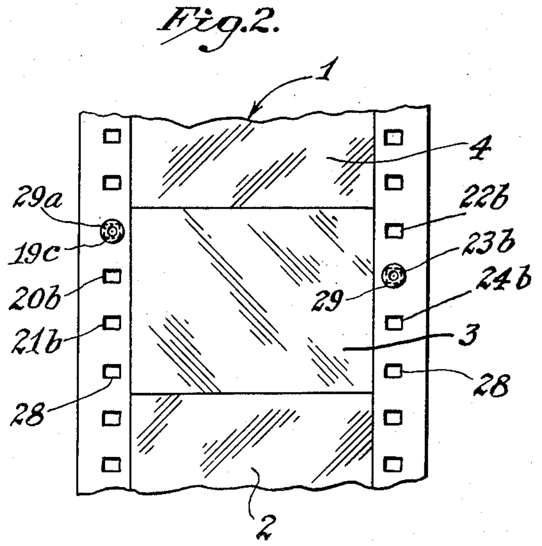
Fig. 2 is a front view of a standard moving picture film such as may be used in connection with the present invention.

In the case of the present example the series of still pictures which illustrate the representative phases of the record, are provided by the frames of a standard moving picture film 1 as is illustrated by Fig. 2. This film does not carry moving pictures, the various frames representing still pictures which are to be displayed for periods of time which are of substantial length as compared to motion picture projection work. Of the series of frames only three are illustrated by Fig. 2 these being numeraled 2, 3 and 4, 2 and 4 being shown only partially. The arrangement of still pictures on moving picture film is not by itself new, and those skilled in the art can without trouble produce the series of pictures, preferably in script form, as required for the present invention.

Figure 1:
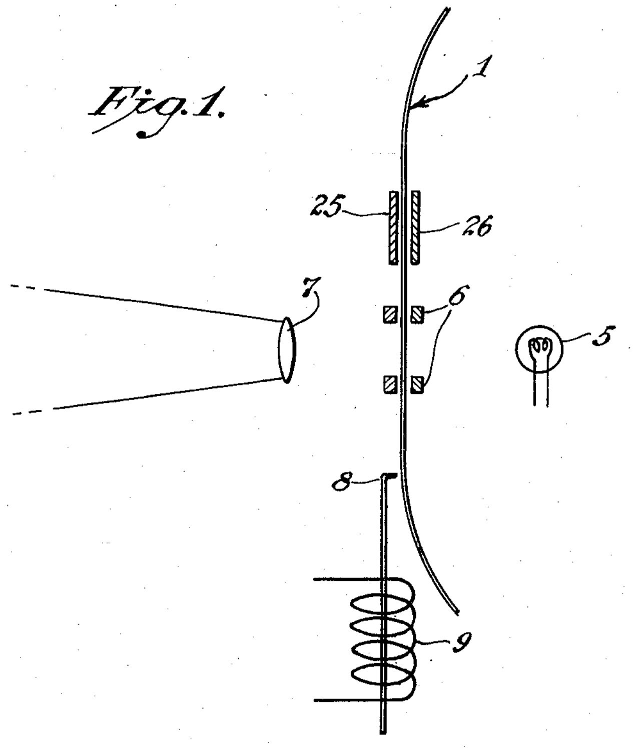
Fig. 1 is a vertical, side and partly sectioned view schematically showing an optical film still picture slide projector incorporating details required by the present invention.

The art is also familiar with projectors suitable for displaying the series of pictures one at a time. Therefore, Fig. 1 shows only the light source 5, the film gate or aperture 6 and the projection lens 7. Obviously the usual condensing lens, the necessary housing, and other features are used in the practical operation of the invention.

This projector also includes means for shifting the series sequentially from one picture to the next. Such means are commercially available and are illustrated simply as comprising fingers 8 which engage the film 1 by way of its sprocket holes and pull it downwardly so that the pictures are framed in the gate 6 one at a time in succession. These fingers 8 are actuated by an electrical solenoid 9 so that each time this solenoid 9 is energized the film 1 is drawn downwardly one picture frame.

Figure 5:
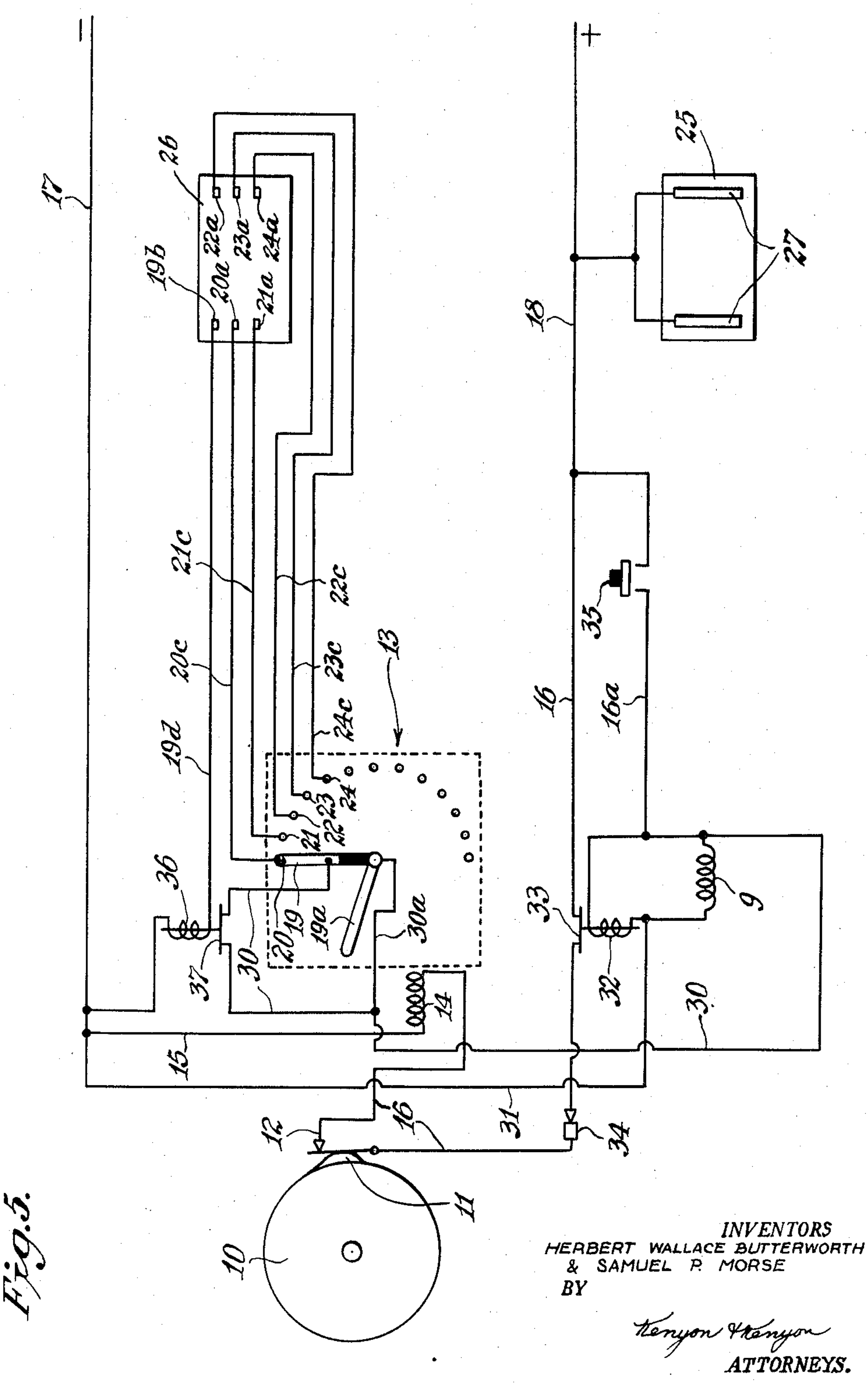
Fig. 5 is a diagram schematically showing the principal operating details of this specific example of the present invention.

The disk record may be played on any phonograph and in Fig. 5 only the necessary turntable 10 is illustrated. This turntable may be either the light-weight turntable of a record changer such as is used in the home or the heavy professional type turntable such as is used by the disc jockeys and in broadcasting stations generally. The only modification made to this turntable is the provision of one or more of the cam lobes 11 together with a small normally-open micro-switch 12 which is arranged in the path of travel of each cam lobe 11 so that as the turntable 10 revolves the switch 12 closes. In most cases only a single cam lobe is required this closing the switch 12 once for each turntable revolution. These elements are inexpensive and may be easily attached by an inexperienced person to the ordinary phonograph equipment. The orientation of the cam member with respect to the turntable is unimportant, this likewise being true as to the positioning of the switch 12. The only requirement is the actuation of the switch periodically in synchronism with rotation of the turntable.

Stepping relays are available generally today in many forms and their relatively high production rate has made them comparatively inexpensive. This invention uses a stepping relay as a means for counting the revolutions of the turntable and for actuating the shifter, provided by the parts 8 and 9, upon reaching any of a plurality of counts.

With the above in mind, Fig. 5 shows the stepping relay generally at 13. This relay's stepping solenoid 14 is connected by lines 15 and 16 to an electrically powered circuit comprising the lines 17 and 18 to which the lines 15 and 16 respectively connect. The micro-limit switch 12 controls the line 16 so that each time the turntable 10 revolves for a complete turn of 360° the stepping relay's solenoid 14 receives an electrical impulse. This relay has the usual stepping contactor 19, stepped by the solenoid 14, and the usual series of contacts 20, 21 and so on through to 24. Actually there are more of these contacts in the usual relay but only the numeraled ones are used in the case of the illustrated example of the present invention.

As shown by Fig. 1 the projection means includes a front contact shoe 25 and a back wafer 26. The film 1 passes between these elements 25 and 26. Fig. 5 shows the interfacing surfaces of these parts, the front contact shoe 25 providing long electrically conductive bars 27 which extend the length of a number and preferably all of the sprocket holes of one frame of the film 1. Preferably these members 25 and 26 are positioned outside of but adjacent to the projector's gate 6. The back wafer 26 is provided with a series of switch elements corresponding to the relay contact series. These switch elements may take many forms but as illustrated they comprise conductive segments 20*a*, 21*a* and so on through to 24*a*. These conductive segments cooperate with the conductive bars 27 of the front contact plate 25, whenever the film 1 is provided with a conductive element or other conducting means for carrying the current from the bars 27 to one or another of the contact segments of the back wafer 26.

Referring again to Fig. 2, the standard 35 mm. photographic film provides four sprocket holes on each side of the picture frame and for each frame. As shown by Fig. 2 these holes are numbered 20*b*, 21*b* and so on through to 24*b*. As can be seen the location of these indicated sprocket holes corresponds to the pattern of the contacts on the back wafer 26. The two lowermost holes 28 must be left free for engagement by the fingers 8 of the film shifter.

Figure 4:
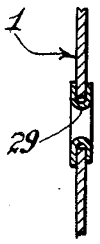
Fig. 4 is a vertical section taken on the line 4—4 in Fig. 3.
Figure 3:
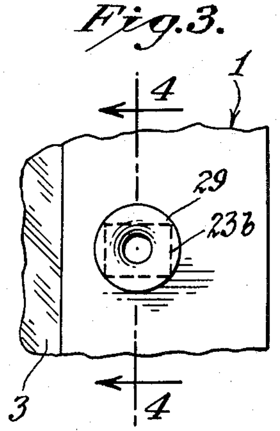
Fig. 3 is a greatly enlarged view showing a portion of the sprocket hole side strip of the film of Fig. 2.

Actual closing of the circuit, for the various switch elements 20*a* through 24*a*, is effected by inserting an ordinary metal eyelet in one or another of the indicated sprocket holes, excluding the holes 28. As shown by Fig. 4 such an eyelet 29 may be installed by means of an ordinary eyelet machine. When installed as shown by Fig. 2, when the frame carrying this eyelet 29 registers between the two parts 25 and 26 the eyelet 29 closes the circuit between the contact segment 23*a* and the corresponding contact bar 27 of the front plate 25.

Each of the relay's contacts connects with its corresponding switch elements on the wafer 26, by way of the lines 20*c*, 21*c* and so on through to 24*c*. These lines constitute part of the powered line 18 in the sense that one or another is placed in circuit with the line 18 by the eyelet 29, and each of these lines 20*c* through 24*c* connects with the line 17 by way of the contactor 19 and through a line 30 and the shifter solenoid 9 and the line 31.

Now it becomes obvious that each time the turntable 10 turns a full turn the stepping relay contactor 19 advances one step. The powered circuit through the shifter solenoid 9 is not closed until the contactor 19 steps to the one of the series of contacts which is connected with the one of the switch elements which is closed by the conductive member or eyelet 29. In the illustrated case the contactor 19 must step to the contact 23 because the eyelet 29 is in the sprocket hole 23*b* to which the contact segment 23*a* corresponds. Of course, this member 23*a* in turn corresponds to the stepping relay contact 23. Each time the powered circuit is closed the solenoid 9 is energized so as to shift the film.

It also now becomes obvious that the eyelet 29, or its equivalent, provides a cuing means whereby each picture frame may be cued for shifting after a predetermined number of turntable rotations. The turntable rotations are of necessity synchronized to the audio recorded on the record played on this turntable. It follows that from any given record the still picture film manufacturer or producer can cue the film by playing the record and inserting the eyelets or other devices 29 in the appropriate one of the sprocket holes of the film. As each picture frame is displayed the stepping relay 13 counts off the number of revolutions of the turntable, predetermined by the cuing of the film, and then shifts the picture to the next frame.

The stepping relay 13 has the usual contactor resetting solenoid 32 which is energized simultaneously with the solenoid 9. This solenoid 32 is arranged to open a normally-closed switch 33 in the line 16 so as to deactivate or open the various powered circuits while the film is shifting, this preventing the apparatus from becoming confused as the eyelet 29 is pulled past the various contact segment series of the back wafer 26. Furthermore, the relay 13 provides another switch 34 which is cam-operated mechanically so as to open during the time the contactor 19 is shifting back to its starting position over its contact series. This normally-closed switch 34 is inserted in the line 16 so as to also open and deactivate all of the powered circuits to prevent trouble during the resetting of the contactor 19. In other words, by deactivating or opening all of the powered circuits none of these circuits is closed as the contactor 19 resets even though the resetting solenoid 32 is de-energized as soon as the contactor 19 leaves the one of its contacts which initially completed the circuit so as to energize the solenoids 9 and 32.

It is to be understood that the phonograph record is played on the turntable 10 without regard to orienting the audio of the record with respect to the cam lobe 11. This permits the audio to be almost 360° out of phase with the illustrating pictures in some instances. This ordinarily is unimportant but if closer synchronism is desired a plurality of the cam lobes 11 may be used in conjunction with an appropriate impulse counter.

In any event, it is necessary to start the audio and picture series off together. The first of the picture series may constitute a blank which is registered with the projector's gate 6 during the setting up for a showing. If the electrical system starts its operation as the audio starts to be reproduced it becomes possible to both cue the picture series, by using the eyelets or other similar means, and to reproduce the picture series with the record in the manner intended by the editor who did the cuing.

With the above in mind, a normally-open, manually-closed switch 35 is connected by a branch line 16a from the line 18 directly to the solenoids 9 and 32 so that by way of the line 31 which goes to the other power line 17, these solenoids may be energized by manually working the operator of the switch 35 to close the latter. When the switch 35 is closed the solenoid 9 shifts the film to the first still picture of the series and the solenoid 32 resets the contactor 19 in case this contactor is not at its starting position for any reason. This switch 35 is closed as soon as the operator of the apparatus hears the audio starting to be reproduced from the record on the turntable 10, the switch 35 then being immediately released so that it opens. Thereafter, the stepping relay 13 starts its counting operation.

Because the cam-operated switch 12 produces an impulse for each revolution of the turntable 10 the editor who cues the film series may find that the relay 13 does not provide adequate projection times for certain of the pictures to illustrate properly the corresponding phase of the audio. This difficulty may be overcome by the use of duplicating pictures but this makes the series of pictures more expensive and is generally undesirable.

According to the invention the above problem is overcome by providing the relay 13 with a second contactor 19a which is electrically insulated from the contactor 19 and angularly related thereto so that the contactor 19a trails the contactor 19. The two contactors are mechanically interconnect for simultaneous movement. It may have been noted that in Fig. 2 the upper left-hand sprocket hole has been previously ignored. This is also true of the left-hand one of the switch elements of the back wafer 26. This extra switch element 19b corresponds to the upper left-hand sprocket hole 19c, this switch element 19b being made like the other switch elements but being connected by a line 19d through the solenoid 36, of a relay, to the line 17. This relay has normally-closed contacts 37 through which the line 30 connects through the contactor 19. A branch line 30a connects the second or trailing contactor 19a with the line 30.

With the above arrangement the previously described counting operation results unless a cuing element 29a is placed in the sprocket hole 19c. This element may be a duplicate of the element 29. When the editor uses this cuing element 29a the previously described counting ability of the relay 13 is increased by a multiple of two. When the still picture frame shifts to projecting location the conductive cuing member 29a closes the circuit from 27 to 19b, this energizing the solenoid 36 and opening the normally-closed contacts 37. Therefore, as the relay 13 steps, the contactor 19 is inactive and when the contactor 19 reaches the relay contact following the contact 24 the trailing contactor 19a, which is the effective contactor, reaches the first contact 20. From that time on the operation is as previously described.

As can be seen from Fig. 1 the cuing of the sprocket holes need not be done at the picture frame cued. It may be done, and preferably is done, at a trailing location and as long as this location is spaced uniformly from each picture frame cued, proper operation is obtained.

In the illustrated example the sprocket hole portion of the usual photographic film provides a carrier for the cuing means. This carrier is obviously connected to the series of pictures so as to shift with the latter. It is also possible to provide an entirely separate carrier member which is mechanically connected to the series of pictures. For example, separate pictures may be framed in a carrier member made of paper, plastic or the like, and this carrier member may have the cuing means mounted to it by the editor. This may be of advantage in case larger transparencies are desired than can be obtained with 35 mm. film, or, alternately, when even smaller pictures are suitable. 16 mm. film for example may not permit the use of its sprocket holes as described because of mechanical considerations.

As previously indicated the eyelets 29 may be substituted by any conductive arrangement that will carry the current from the elements 27 to the proper one of the switch elements of the back wafer plate. These switch elements are actually merely fixed contacts in the case of the illustrated example. They are referred to as switch elements because it may be possible to use other means to provide an electrical switching action in response to cuing means moving with the picture series.

The electrical equipment of Fig. 5 is simple and may be arranged so as to be physically very compact. The film series producer cues the series to any given phonograph record and only the picture series need be purchased by the ultimate user. Phonograph record stores can sell the series to the purchaser of a new standard phonograph record, for example, and a disc jockey may purchase the picture series as required to fit the records he plans to play. For home use the projector may project on a ground glass screen enclosed by a suitable cabinet or the picture may be thrown on the reflector screen so customarily found in homes for movie and still picture projection purposes. In the television studio the projector will, of course, work with the usual picture pick-up arrangement such as is now used to reproduce moving pictures, for example.

In all cases the user requires no training. The picture series is slipped into the projector and the record playing is started. When the user hears the first audio the starting switch 35 is operated and from then on everything is automatic. Ordinarily slight delay in operating the switch 35, after the audio has started, does not produce any noticeable lack of synchronism.

The series of switch elements 20*a* through 24*a*, and the switch element 19*b* have been shown as being of the mechanically-operated type in that they function as six contacts while the cuing means 29 and 29*a* function as moving contactors which close with one or another of these switch elements which function as fixed contacts. This arrangement has the advantage of simplicity and initial low cost, and the cuing may be done with very simple equipment.

However, this mechanical type of switching arrangement has the disadvantage that each film series must be separately cued, and if the film series is to be mass-produced this type of cuing becomes excessively expensive. Although involving a somewhat higher initial cost, for the equipment, the modification shown by Figs. 6 through 8 have the advantage that large numbers of any given picture series, properly cued, may be produced entirely by the photographic printing method with its attendant advantage of low cost.

Figure 7:
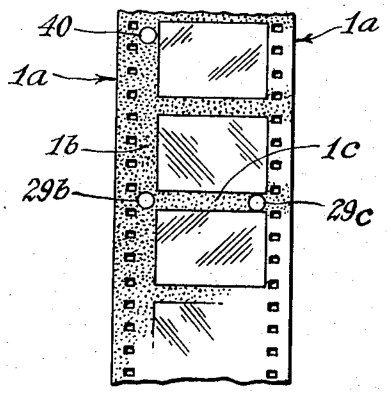
Fig. 7 is like Fig. 2 but shows the film in modified form for use with this second example.

Referring to Fig. 7, the film strip 1*a* is again moving picture film but is of the sound film type having a longitudinally extending portion 1*a* for the sound strip, and transverse portions 1*c*, interposed between the frames which are required to provide the typical horizontally elongated contour for the picture frames themselves. Without these portions 1*c* each frame would be substantially square in view of the portion 1*b*.

With the above film the cuing may be done by printing on the negative or master film so that on the prints produced photographically therefrom the portions 1*b* and 1*c* are substantially opaque excepting for the cuing means 29*b* and 29*c*. In this case these cuing means take the form of light passages or apertures formed photographically by appropriate spotting of the negative or master film from which the prints are photographically reproduced. Once the negative or master film is cued, by the spotting, any number of prints may be made at the same cost of standard moving picture prints. The film may, of course, be either black and white or color film.

Figure 6:
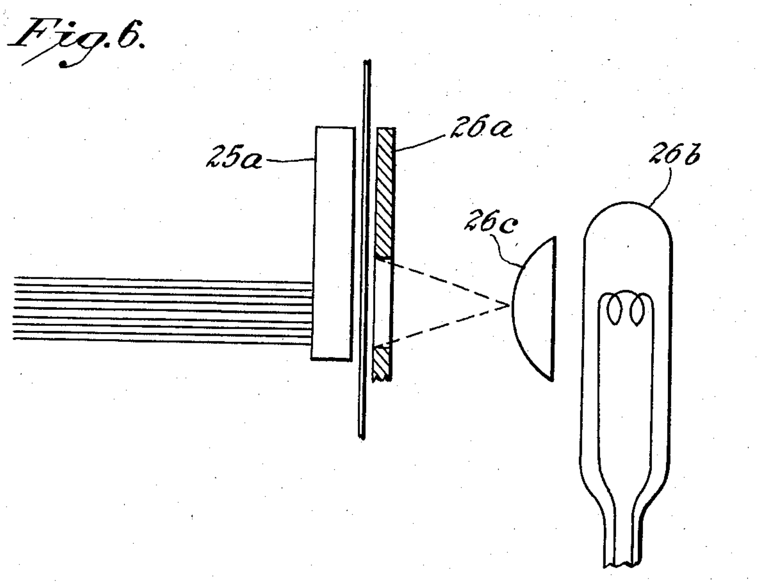
Fig. 6 shows a modification of the details of Fig. 1, to provide a second example of the invention.
Figure 8:
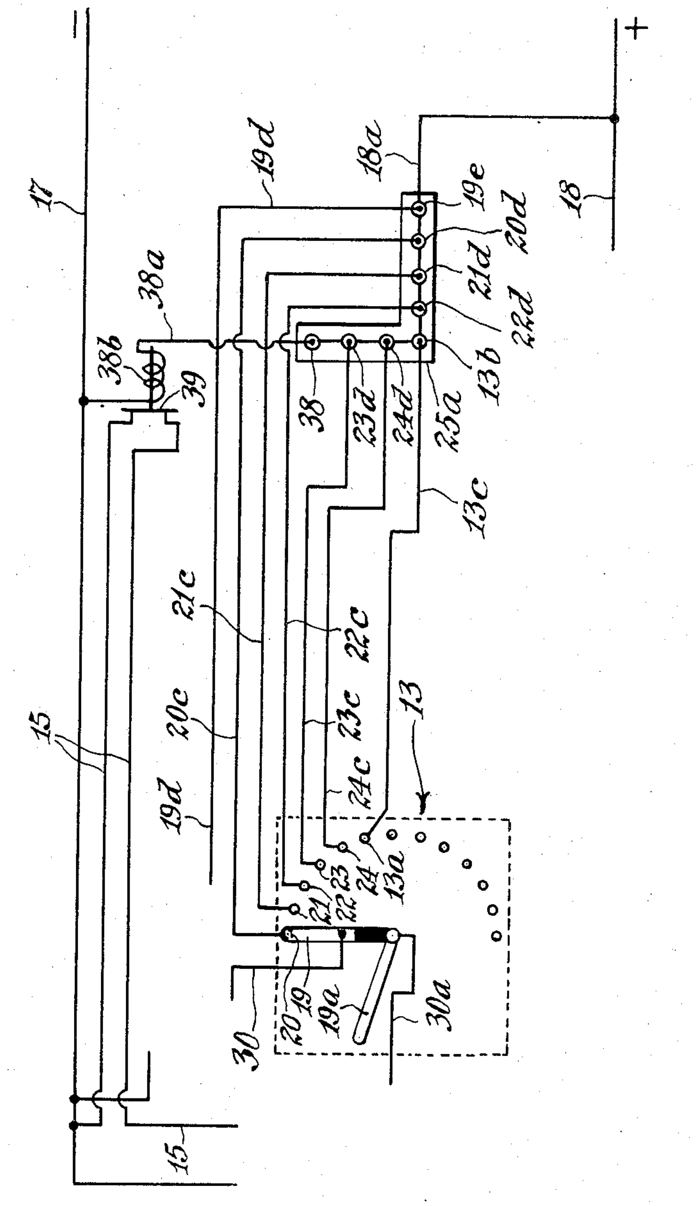
Fig. 8 shows a portion of the diagram of Fig. 5 modified to operate in accord with this second example of the invention.

To use this film strip of Fig. 7 the previously described apparatus also requires modification. As is shown by Fig. 6 the front contact shoe 25 is replaced by an L-shaped mounting 25*a* which mounts an L-shaped series of photo-conductive cells 19*e* and 20*d* through 24*d* which correspond with the contacts of the front contact shoe 25. The back wafer 26 is replaced by a mask 26*a* which provides an L-shaped cut-out or aperture coinciding with the configuration of the part 25*a*, along with the light source 26*b* and a suitable lens 26*c*. The shape of the part 25*a* is shown by Fig. 8, the aperture of the mask 26*a*, of course, corresponding and this shape is determined by the configuration of the series of photo-conductive cells which is in turn dictated by the opaque portions 1*a* and 1*c* provided by sound moving picture film.

The photo-conductive cells may be of the commercially available type which are relatively non-conductors of electricity when they do not receive light and which become substantially electrically conductive when illuminated by light. These cells may not have enough current-carrying capacity to operate the stepping relay and in that event it is, of course, possible to use a pilot circuit arrangement. In such an arrangement the cells would in the usual fashion operate one or more relays having contacts of adequate current-carrying capacity to operate the stepping relay. Such arrangements are common in photo-cell circuitry generally and because of this and because illustration of their details would complicate the drawings such arrangements are not illustrated.

The operation of this modification is substantially like that described before. It may be possible to increase the number of cuing positions available as is indicated by the inclusion of the contact 13*a* of the stepping relay, this contact following the contact 24 previously described. This contact 13*a* is connected by a line 13*c* with the cell 13*b* so that an extra position is provided. This increases the cuing possibilities. The cell 19*e* functions like the contact 19*b* of the switch element previously described. Generally speaking, the same numerals have been used as were used before, the use of different letters providing the necessary identification of the different parts. The photoconductive cells function as switch elements as did the contacts of the first example.

Although a separate light source 26*b* is shown it is, of course, possible to use the picture projecting lamp 5 of the projecting apparatus, for the purpose of providing the necessary illumination of the various photo-conductive cells. This may be done by the use of a reflector arrangement or the like.

In the case of the first example the apparatus stopped operating after the last of the cuing means had passed their switch element operating positions. On the other hand, in the case of this second example the apparatus will not stop operating unless the light source 26*b*, or its equivalent, is extinguished or the last frame has its portions 1*b* and 1*c* completely opaque throughout.

A positive stop may be provided regardless of any condition by the inclusion of an extra photo-conductive cell 38 which when illuminated closes a circuit between the lines 17 and 18 by way of a line 38*a* which connects through the solenoid 38*b* of a relay. This relay keeps the circuit through the line 15 closed by way of normally-closed contacts 39 which open when the solenoid 38*b* is energized.

The photo-conductive cell 38 is positioned so that normally it is protected from the light by the opaque portion 1*a* of the film strip. When the last frame in the series is reached a properly located light passage 40 permits the light to reach the cell 38 so that the contacts 39 open and the apparatus is de-energized generally. This same operation follows if the lamp 26*b* is lighted while no film strip is in the projection apparatus, or if the film strip is removed while the apparatus is in operation.

This second example, of course, has all of the usual advantages attendant to the use of photo-cell operation in general. In addition, it has the great advantage that the cuing may be photographically printed along with the printing of the film strips in mass quantity.

For some uses exact synchronism between the audio and picture displays may be desirable. Assuming that the button switch 35 is depressed just when the audio starts, the circuit is set up for operation when the cam 11 operates the switch 12. If the record is not oriented in azimuth so that the record's audio starts as the cam operates this switch 12, exact synchronism is not obtained, although the result is satisfactory for many uses. However, it is possible to apply a mark or cue to the record so that the location where the audio starts is made visible, and by aligning such a mark with the cam 11 exact synchronism is obtained when the switch 35 is operated just as the audio starts.

We claim:

1. Apparatus for exhibiting still pictures visually illustrating in appropriate sequence and for appropriate time periods various representative phases of an audio record of a performance capable of both audio and visual reproduction, said apparatus including a series of still pictures illustrating said phases and arranged in the sequence of said performance, a turntable for use in playing back said record, means for exhibiting said picture series and including a shifter for shifting said series sequentially from one picture to the next, means for counting the revolutions of said turntable and for actuating said shifter upon reaching any of a plurality of counts and including a control system for selecting the count desired to effect said actuation, and cuing means connected to said series and shifting therewith and including a separate cue for each of said pictures, said control system including means actuated by each of said cues for selecting said count.

2. Apparatus for exhibiting still pictures visually illustrating in appropriate sequence and for appropriate time periods various representative phases of an audio record of a performance capable of both audio and visual reproduction, said apparatus including a series of still pictures illustrating said phases and arranged in the sequence of said performance, a turntable for use in playing back said record, means for exhibiting said picture series and including a shifter for shifting said series sequentially from one picture to the next, means for producing an electrical impulse each time said turntable rotates a predetermined angular extent, a stepping relay having a solenoid connected to receive said impulses and a contactor stepped by said solenoid and a series of contacts for said contactor, said picture exhibiting means including a series of electrical switch elements corresponding to said relay contact series and said shifter having an actuating solenoid and said relay having a contactor resetting solenoid, electrically powered circuits connected to said shifter and resetting solenoids through said relay contactor and contacts and the latters' said corresponding switch elements, said switch elements being located adjacent to the traveling path of said picture series shifted by said shifter, cuing means for each of said pictures, and a carrier for said cuing means and connected to said series for shifting therewith, each of said cuing means being adapted to actuate one or another of said switch elements, depending on the location of said cuing means on said carrier and upon shifting of its picture for exhibition by said exhibiting means, so as to close the one of said circuits through said actuated switch element and through the one of said relay contacts to which said switch element corresponds and through said contactor when it steps to said one of said contacts.

3. The apparatus defined by claim 2 and further including means for opening said circuits when said shifter solenoid is energized and means for holding said circuits open during resetting of said contactor.

4. The apparatus defined by claim 2 and further including a time period multiplying switch element grouped with said series of switch elements, a time multiplying cuing means for at least one of said pictures and located on said carrier for actuation of said time multiplying switch element when its picture is shifted for exhibition by said exhibiting means, a relay having a normally-closed electrical switch connected in all of said circuits and a solenoid for opening said switch and having an electrically powered circuit connected to this just said solenoid through said time multiplying switch element, said stepping relay having a second contactor connected to the first-named contactor for stepping therewith but at a trailing location, and a circuit connected to shunt the first-named powered circuits around said normally-closed relay switch by way of said second contactor when the latter steps to the one of said stepping relay's contacts to which said switch element actuated by the first-named said cuing means corresponds.

5. The apparatus defined by claim 2 wherein said pictures are provided by the frames of a film strip having sprocket holes and said cuing means is provided in each instance by an element fixed in one or another of said sprocket holes and said carrier is provided by the film portion through which said sprocket holes are formed.

6. The apparatus defined by claim 2 and further including a manually-closed normally-open switch connected to shunt said powered circuits around said stepping relay's contactor and contacts and around said switch elements.

7. The apparatus defined by claim 2 wherein said pictures are provided by the frames of a film strip having opaque portions for each frame, and said cuing means is provided in each instance by a light passage in said opaque portion, and said carrier is provided by the film portion having said opaque portion, said switch elements being of the light-responsive type and said picture exhibiting means having means for projecting light to said switch elements with said opaque portion shielding said elements excepting for said light passages.

8. The apparatus defined by claim 2 and further including an electrical switch element associated with said series of switch elements and means controlled by this last-named switch element for opening said circuits, one of said cuing means for the last of said series of pictures actuating said last-named switching element.

References Cited in the file of this patent

UNITED STATES PATENTS

| | | |
|---|---|---|
| 2,116,314 | Jenkins et al. | May 3, 1938 |
| 2,618,197 | Boushey | Nov. 18, 1952 |
| 2,631,855 | Kornei | Mar. 17, 1953 |